Patented Nov. 12, 1935

2,020,543

UNITED STATES PATENT OFFICE 2,020,543

BRAKE FLUID

Franklin Phineas Frey, Cleveland, Okla., assignor to Johnson Oil Refining Company, Chicago, Ill., a corporation of Delaware No Drawing. Application January 2, 1935, Serial No. 106

3 Claims. (Cl. 252—5)

This invention relates to fluid operated brake systems and particularly to the character of the liquid used in such systems.

The desired characteristic of liquids of this character are that they shall retain a relatively high viscosity at the high temperatures encountered in the summer time so that it is not difficult to avoid leakage past the pistons in the various cylinders of the system. Furthermore, the viscosity of the liquid must be such as to permit free flow at the extreme low temperatures to which the braking system is subjected.

The ideal liquid would, of course, be one having substantially the same viscosity characteristics from a low temperature of around forty degrees below zero to a maximum temperature of one hundred twenty degrees above zero, but such a liquid is very difficult to obtain. It is also a requirement of the brake liquid that it shall have sufficient lubricating value as to lubricate the pistons in their movement in the cylinder.

It is the object of the present invention to provide liquid for use in fluid operated brake systems which will fulfill as nearly as possible the above enumerated requirements.

Applicant has discovered that a solution of ethyl-acetate and castor oil when combined in the proper proportions, provides a liquid which is quite satisfactory in fulfilling the requirements enumerated above.

While the exact proportions are not absolutely essential, applicant has obtained the best results with a solution of this character wherein there is more ethyl-acetate by volume than castor oil. For example, it has been found that a solution, containing substantially 40% castor oil and 60% ethyl acetate by volume, is most satisfactory. The ethyl-acetate has a very low coefficient of viscosity which varies very slightly within the temperature degree range encountered by the brake fluid and serves as a means for balancing or offsetting the variation in viscosity of the castor oil at the lower temperatures.

The proportions may be varied within reasonable ranges to accommodate the different temperatures encountered—as for example, in very low temperatures it follows that the full proportion of ethyl-acetate specified namely 60% would be advisable, while in high temperatures where the viscosity of the castor oil is comparatively low, the lesser amount of ethyl-acetate could be used.

While the above solution is particularly adaptable for use in brake cylinders of fluid operated brake systems, it is also of considerable value for use in such devices as shock absorbers and the like, and obviously the claims are intended to cover such similar devices.

Having thus described the invention, what is claimed as new and desired to be secured by Letters Patent is:

1. A liquid for use in cylinders of fluid operated brake systems and the like consisting of castor oil and ethyl-acetate.

2. A liquid for use in cylinders of fluid operated brake systems and the like consisting of ethyl-acetate and castor oil in which the volume of ethyl-acetate is greater than that of the castor oil.

3. A liquid for use in cylinders of fluid operated brake systems and the like consisting of a solution of approximately forty per cent castor oil and approximately sixty per cent ethyl-acetate.

FRANKLIN PHINEAS FREY.